(12) United States Patent
Hamilton

(10) Patent No.: US 8,251,014 B2
(45) Date of Patent: Aug. 28, 2012

(54) ANTI-SPILLING, SELF-RIGHTING LIVESTOCK FEEDER

(76) Inventor: Dawn M. Hamilton, Pensacola, FL (US)

(*) Notice: Subject to any disclaimer, the term of this patent is extended or adjusted under 35 U.S.C. 154(b) by 0 days.

(21) Appl. No.: 12/260,462

(22) Filed: Oct. 29, 2008

(65) Prior Publication Data

US 2009/0199774 A1 Aug. 13, 2009

Related U.S. Application Data

(60) Provisional application No. 61/063,848, filed on Feb. 7, 2008.

(51) Int. Cl.
*A01K 5/01* (2006.01)
(52) U.S. Cl. .............. 119/61.54; 119/61.1; 119/61.5
(58) Field of Classification Search ............ 119/61.1, 119/61.5, 61.55, 61.54, 72; 220/603, 719
See application file for complete search history.

(56) References Cited

U.S. PATENT DOCUMENTS

| | | | |
|---|---|---|---|
| 434,423 A | 8/1890 | Burrows | |
| 2,259,682 A * | 10/1941 | Collins | 119/61.54 |
| 2,601,767 A | 4/1946 | Wall | |
| 3,076,435 A * | 2/1963 | Seymour | 119/77 |
| 3,152,576 A * | 10/1964 | Faurot | 119/72 |
| 3,307,602 A * | 3/1967 | Boster | 220/254.7 |
| 3,734,062 A * | 5/1973 | O'Hara | 119/61.54 |
| 4,303,170 A * | 12/1981 | Panicci | 220/603 |
| 4,388,996 A | 6/1983 | Panicci | |
| 4,436,056 A * | 3/1984 | MacLeod | 119/72 |
| 4,440,111 A | 4/1984 | Meyer | |
| 4,742,935 A * | 5/1988 | Schellenberg | 220/791 |
| 4,953,737 A | 9/1990 | Meyers | |
| 4,981,108 A * | 1/1991 | Faeroe | 119/61.53 |
| 5,791,287 A * | 8/1998 | Gruber | 119/74 |
| 5,960,740 A * | 10/1999 | Pelsor | 119/61.54 |
| 6,112,698 A | 9/2000 | Zelinger | |
| 6,142,101 A * | 11/2000 | Pelsor | 119/61.54 |
| 2006/0207993 A1 * | 9/2006 | Copeland | 220/574 |

* cited by examiner

*Primary Examiner* — Kimberly Berona

(57) ABSTRACT

An anti-spill, self-righting animal feeder particularly suitable for horses comprising a hollow bowl-shaped vessel with means on the top rim of the vessel to limit the degree of tipping from the vertical including a radially outwardly extending flange mounted on the top rim and an internal inwardly and downwardly extending flange integral therewith defining a trap for feed at the top of the bowl together with weight means on the bottom of the vessel such that the center of gravity of the feeder rises when it is tipped from the vertical.

7 Claims, 3 Drawing Sheets

ANTI-SPILLING, SELF-RIGHTING LIVESTOCK FEEDER

This application claims priority to Provisional Application Ser. No. 61/063,848 filed by the applicant on Feb. 7, 2008 for A SELF-CORRECTING CONTAINER/ANIMAL FEEDER.

TECHNICAL FIELD

This invention relates to animal feeders generally and specifically to an anti-spilling, self-righting bucket-type feeder preferably for feeding horses particulate feed generally and particularly dietary supplements and suitable for use on uneven surfaces.

BACKGROUND OF INVENTION

Self-righting vessels for use with liquids are known in the art. For example, U.S. Pat. No. 4,953,737 ('737) describes the physics of self-righting behavior for his drinking cup for liquids having a lid for use by adults riding in a vehicle or a child in a highchair. The cup of the '737 patent neither rocks because of a round or hemispherical bottom nor relies on a weighted base. The inventor asserts that the self-righting capability is imparted to the vessel by the shape of the vessel sides, whose vertical cross section is an involute defined by a hypothetical circle located inside the cup. (See Column 1 lines 1-65) There is no indication that this invention would be suitable for granular solids or without a lid.

Another self-righting drinking cup is disclosed in U.S. Pat. No. 4,388,996, which also has a lid with a drinking spout. While a weight is shown in the bottom of the vessel, the inventor asserted that "Advantageously, since the cup has a high D/H ratio, it has a significant self-righting tendency without any weighting, and, as shown in FIG. 3, only a small weight is required to be added to assure consistent righting of the cup when filled or only partially filled, in resulting in a lightweight cup, e.g., weighing less than 15 grams per fluid ounce of cup capacity.

U.S. Pat. No. 434,423 discloses a self-righting milk bucket having a spherical bottom with a weight C, a safety tube D and a strainer G inside of the safety tube and generally coaxial therewith. The upper portion of the vessel is cone-shaped. The inventor asserts that: "If the upper portion of the bucket were not cone-shaped the bucket would not work in the manner heretofore described as the weight to the contained liquid would not be greatest at the bottom. It is essential that the great body of the milk, and hence the greatest weight, should be at the bottom to assist the return of the bucket to its normal position when tilted" (Column 2, lines 54-62).

Another example of a self-righting cup for liquids is shown in U.S. Pat. No. 2,601,767. It employs a lid or splash shield, which is readily inserted and removed from the cup opening to prevent large quantities of liquid spilling out of the cup when it is tipped over. Additionally, the lid is inwardly concave so that liquid spilling from what the inventor terms a recess 10 during use will be retained in the convexity and flow back to the cup through an opening and vent hole, 9 at the bottom-most portion of the lid. The cup has a false bottom 4 and a convex bottom 3 filled with shot for weight.

Animal and pet feeders are shown in U.S. Pat. Nos. 4,440,111 ('111) and 6,112,698 ('698). The '111 patent shows a cattle feeder with a hood 16. This is shown for cattle. Horse will not stick his head into a hood such as 16. Moreover, this patent shows a hemispherical base with, sand filling the base. A pan is inserted into the top of the base, which carries the feed supplement. The inventor says the hood is affixed to the base above the pan to protect the mineral supplement in the pan from the weather.

The '698 patent shows an ordinary pet bowl having inner and outer shells crimped together at their rims. The cavity between the shells is filled with sand as ballast to prevent the pet from tipping over the bowl. There are no arcuate side walls, the internal food cavity is straight-walled and there is no assertion that the bowl is self-righting.

SUMMARY OF INVENTION

Horses are frequently fed grain and/or other supplemental nutrients in a granular form from buckets. When feeding supplemental nutrients it is particularly important to insure that known quantities are actually ingested for the animal's health. Horses present a unique problem to being bucket fed. A horse nuzzles granular food using a sideways movement to the tongue, which tends to throw granular material sideways and upwardly at the end of the stroke of the tongue. This action tends to "flip" granular food out of the bucket as well as upset the feeder. Additionally, horses tend to move the muzzle both sideways and upwards during eating which tends to upset a bucket spilling at least some of the feed if not all if the bucket is upset onto its side or upside down. Complicating the matter is the fact that horses do not like to feed from deep buckets or those with hoods through which the horse must insert his head particularly up to or near the eyes.

Still further, horses being fed from a bucket are frequently on rough or uneven ground, certainly not a hard, perfectly flat and level surface such as a concrete pad. This increases the chances of upset of the bucket by the action of the horse when feeding.

Therefore, it is among the objects and advantages of the present invention to provide an animal feeding vessel, particularly for horses that has means for significantly limiting the loss of feed due to the horse's peculiar tonguing and muzzle action and upsetting the vessel spilling its contents. Another object is to provide such a feeding vessel with means to limit the degree that the vessel can be tipped to prevent significant spilling of its contents as well as means for self-righting the vessel if tipped so that the horse will resume feeding from a generally upright vessel.

These objects and advantages as well as others may be achieved by the anti-spill, self-righting feeder a preferred embodiment of which is shown and claimed herein comprising a hollow vessel defined by a bottom and a side wall, the side wall being arcuate outwardly and upwardly along at least a portion thereof extending from the bottom, the top of the side wall defining a rim, the rim defining a first plane when the vessel is resting on the bottom, means on the rim for limiting the degree of displacement of the first plane from that when the vessel is resting on the bottom, means on the rim of the vessel extending inwardly and downwardly defining a trap between the upper portion of the side wall of the enclosure and the rim, and means for urging the first plane toward its original position when the vessel is tipped from resting on its bottom.

BRIEF DESCRIPTION OF THE DRAWINGS

A preferred embodiment of the invention is shown in the drawings in which.

Figure 1:
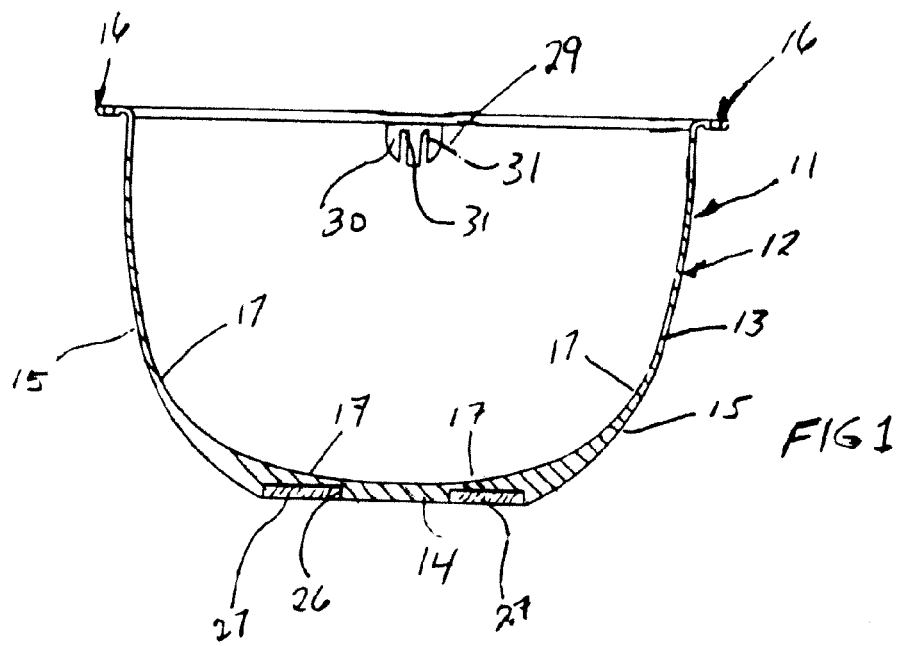
FIG. 1 is a side-elevational, cross sectional view of the vessel without the anti-spill ring mounted thereon.
Figure 7:
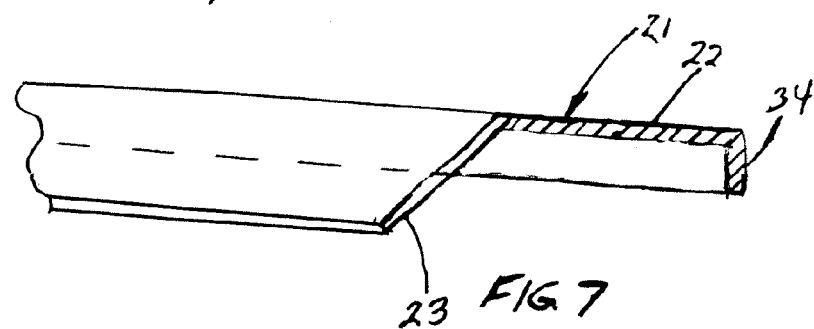
FIG. 7 is an enlarged partial cross sectional view of one-half of the anti-spill rim.
Figure 2:
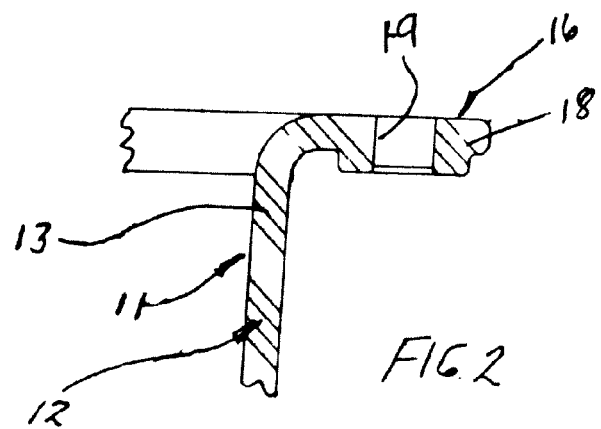
FIG. 2 is an enlarged view of the rim of the vessel shown in FIG. 1.
Figure 3:
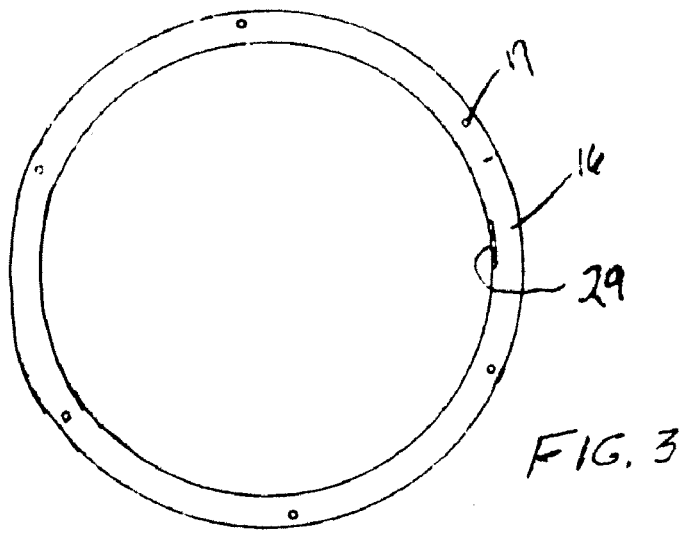
FIG. 3 is a top plan view of the vessel without the anti-spill ring mounted thereon.
Figure 4:
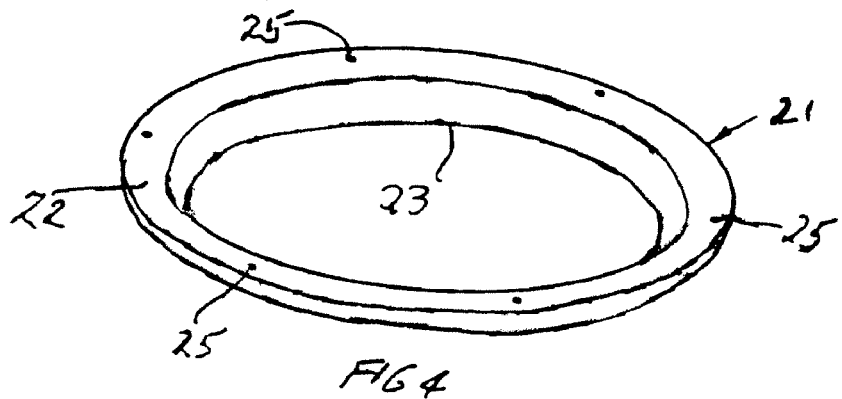
FIG. 4 is a perspective view of the anti-spill ring.
Figure 5:
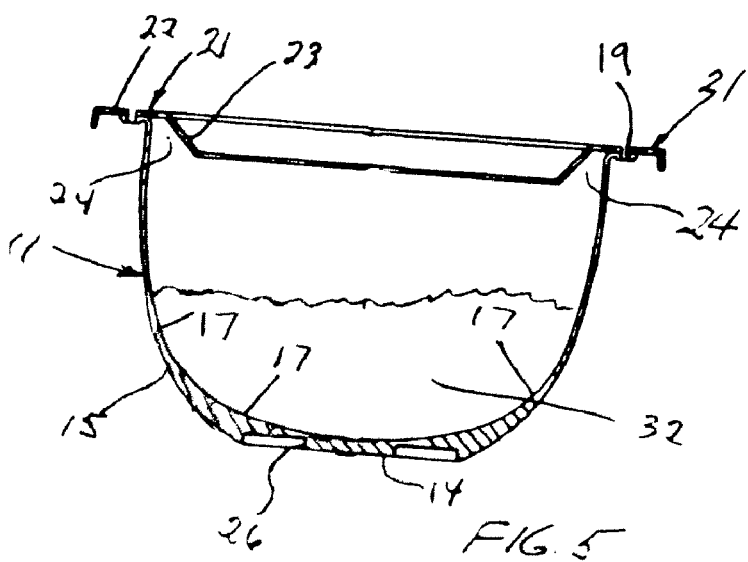
FIG. 5 is a side-elevational, cross sectional view of the vessel with the anti-spill ring mounted on the top of the rim.
Figure 6:
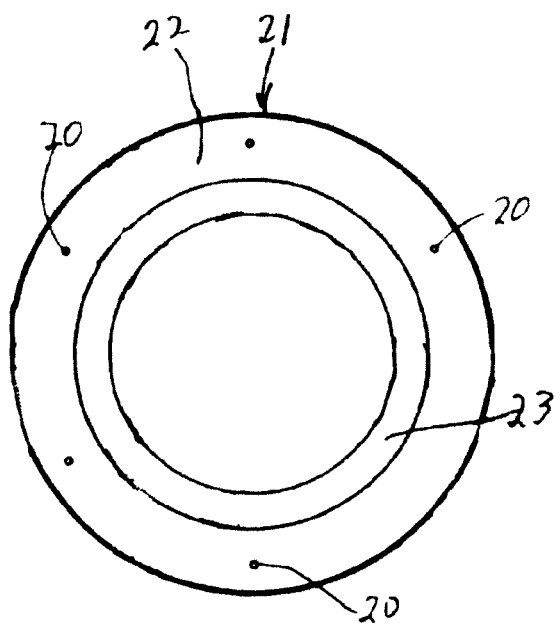
FIG. 6 is a top plan view of the anti-spill ring.
Figure 8:
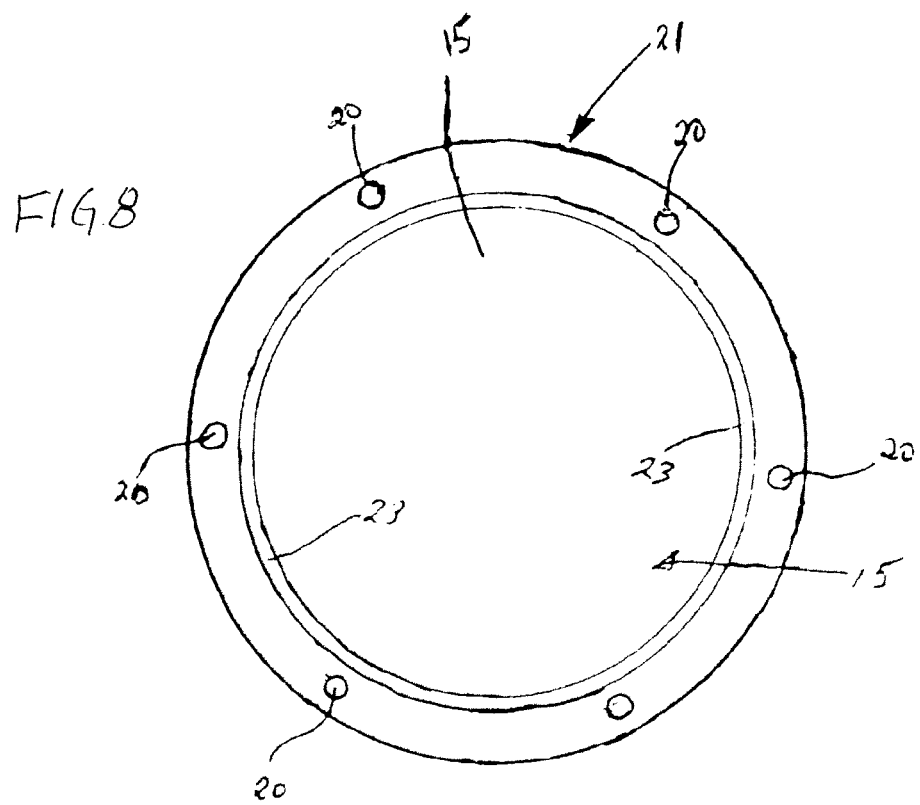
FIG. 8 is a top plan view of the vessel with the ring mounted on top of the rim of the vessel.

Referring now to the drawings in detail, the feeder 11 consists of an open-topped, hollow vessel 12, preferably bowl-shaped, relatively thin-walled shell 13 having a flat exterior bottom 14 an exterior side wall 15 extending arcuately upwardly and outwardly from the bottom 15 terminating in a circular, upper rim 16. Preferably, a relatively short portion of the thin-walled shell 13 proximal to the rim 16 is cylindrical. The interior surface 17 of the shell 13 conforms to the shape of the exterior side wall 15 except proximal to the bottom 15 the interior surface 17 where it is smoothly arcuate throughout rather than conform to the flat, exterior bottom 15.

The upper rim 16 of the shell 13 has a relatively short, radially extending mounting lip 18 somewhat thicker than the shell 13 and is provided with a plurality of holes 19 to receive fasteners 20, 20 etc to secure an anti-spill ring 21 to the rim 16.

The anti-spill ring 21 consists of a radially outwardly extending flange 22, preferably parallel to the plane defined by the rim 16. Formed integrally with the flange 22, the ring 21 has a radially inwardly and downwardly extending flange 23 defining a trap section 24 between it and the upper portion of the wall of the shell proximal to the rim 16. The outwardly extending flange 22 is provided with holes 25 located to align with the holes 19 in the mounting flange 18 on the rim 16. Fasteners 20, 20 extend through the respective holes 19, 19 and 25, 25 to detachably secure the anti-spill ring 21 to the vessel 12.

The bottom 15 of the vessel 12 is provided with an annular recess 26 to receive an annular weight 27. The weight 27 is detachably secured to the bottom 15 of the vessel 12 by screw fasteners 28, 28 so as to be flush with the bottom 15 of the vessel. The recess 26 preferably is dimensioned larger than the outside width of the weight so that different weights can be installed if required. A grated water drain 29 is located immediately proximal to the rim 16 and consists of a generally U-shaped opening 30, and a pair of spaced-apart, upstanding posts 31, 31 that function as a grate.

In operation, the feeder 11 can be placed on turf, which does not have to be precisely horizontal or smooth. Granular feed 32 is placed inside of the vessel 12 and a horse permitted to feed at its leisure.

The relative dimensions of the outside width of the radially extending flange 22 of the anti-spill ring 21 to the depth of the cavity in the vessel 12 and the diameter of the rim 16 is important to prevent substantial spillage of the granular feed 32 due to the horse upsetting the vessel 12. Moreover, the relative dimension and angular disposition of the internal downwardly extending flange 23 to define the size of the trap 24. The outer diameter of the radially outwardly extending flange 22 on the ring 21 is also important to the self-righting of the feeder 11.

In a preferred embodiment of the invention, the external height of the shell 13 is 10.473 inches and the outside diameter of the ring-mounting lip 18 is 17.003 inches. The outside diameter of the radially outwardly extending flange 22 is 19.436 inches. The inwardly and downwardly extending flange 23 depends from the ring 21 about 45 degrees and the diameter of its lowermost edge 33 is 10.734 inches. Preferably, the radially outwardly extending flange 22 on the ring 21 is provided with a downwardly extending lip 34. The inwardly and downwardly extending flange 23 on the ring 21 has an outside diameter (where it is formed on the radially outwardly extending mounting lip 18) is 12.732 inches. The inwardly and downwardly extending flange 23 is about 1.455 inches in length.

In the event the horse starts to upset the feeder 11, before it can spill a substantial portion of the contents thereof, the radially outwardly extending flange 22 on the ring 21 engages the ground thereby limiting the degree of upset from the vertical. In such a position, most of the feed in the feeder will not dump onto the ground as it would if the feeder 11 were turned completely on its side or upside down.

The second anti-spill feature of this invention also assists in preventing spillage of feed when the feeder 11 is knocked out of the vertical and the flange 22 on the ring 21 engages the ground. As feed moves toward the rim 16 of the vessel 12, it falls into the trap section 24. Thus, to actually spill due to upset from the vertical, the feed would have to override the internal edge 33 of the inwardly and downwardly extending flange 23.

The weight 27 is such that the vessel 13 tends to self-right when tilted out of the vertical. The amount of the weight is a function of the dimensions of the feeder 11 and lowers its center of gravity such that when displaced out of the vertical the center of gravity is raised.

The vessel 12 can be made of any suitable material, such as a polymer of some suitable character like a high-density polyethylene. Alternatively, it can be fabricated of a material or mixture of materials that resist cracking particularly in cold weather. This minimizes the danger of broken pieces with sharp edges cutting a horse's lower extremity.

The ring can be made of any suitable material sufficient not to bend from stresses imposed by rough handling by the feeding animal. High-density polyethylene is a suitable material.

What is claimed:
1. An anti-spill, self-righting livestock feeder for granular feed, the livestock feeder comprising:
   a) a hollow vessel for placement on a support surface defining an open top, a flat and generally horizontal bottom and a side wall, the side wall being arcuate outwardly and upwardly along at least a portion thereof extending from the bottom;
   b) a rim at the top of the vessel, said rim defining a plane substantially parallel with the generally horizontal bottom;
   c) an anti-spill ring comprising a radially outwardly extending flange, a radially inwardly and downwardly extending flange and a plurality of holes located there around,
      said outwardly extending flange limiting the degree of displacement of said plane when the vessel is tipped by engaging with the support surface thereby preventing significant spillage of feed as the vessel is tipped, and
      said radially inwardly and downwardly extending flange extending inwardly from said side wall and downwardly from said rim and defining an opening for permitting an animal to insert a portion of the animal's head within the opening to consume feed from the feeder;
   d) a blind trap defined between the upper portion of the side wall and the radially inwardly and downwardly extend- ing flange to trap significant quantities of granular feed from being ejected from the opening as an animal is feeding;

e) a weight for urging the plane toward its original position when the vessel is tipped from resting on its bottom;

f) said rim of the vessel having a radially extending mounting lip provided with a plurality of holes for aligning with the plurality of holes of the anti-spill ring;

g) a plurality of fasteners extending through said holes of said rim and said anti-spill ring so as to detachably secure said anti-spill ring to said vessel; and h) a fluid discharge means positioned within the sidewall of the vessel in the area of the blind trap such that fluid within said vessel may drain from the interior of the vessel while preventing the escape of granular feed therefrom.

2. The livestock feeder of claim 1, further comprising the weight being located on the exterior of the bottom of the vessel, said weight being sufficient to cause the vessel to right itself so as to return the plane substantially parallel to the surface on which the bottom is resting.

3. The livestock feeder of claim 2, wherein said bottom of the vessel is provided with an annular recess and wherein said weight is annular in shape such that said annular weight is detachably secured within said annular recess of the vessel.

4. The livestock feeder of claim 2, wherein said weight is mounted flush with the exterior bottom of the vessel and, the interior surface of the vessel is continuously smooth and the bottom merges arcuately with the arcuate and upwardly extending side wall.

5. The livestock feeder of claim 1, wherein said fluid discharge means comprises a grated water drain, said water drain located immediately proximal to the rim and consists of a generally U-shaped opening and a pair of spaced-apart, upstanding posts.

6. The livestock feeder of claim 1, wherein the inwardly and downwardly extending flange depends from the rim at an angle of about 45 degrees from the plane.

7. The livestock feeder of claim 1, wherein said radially outwardly extending flange is provided with a downwardly extending lip.

* * * * *